US010865936B2

United States Patent
Yan et al.

(10) Patent No.: US 10,865,936 B2
(45) Date of Patent: Dec. 15, 2020

(54) PTZ ASSEMBLY AND A CLAMPING MECHANISM THEREOF

(71) Applicant: SZ DJI OSMO TECHNOLOGY CO., LTD., Shenzhen (CN)

(72) Inventors: Xin Yan, Shenzhen (CN); Bingzhen Yang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/288,873

(22) Filed: Feb. 28, 2019

(65) Prior Publication Data

US 2019/0195418 A1 Jun. 27, 2019

Related U.S. Application Data

(63) Continuation of application No. PCT/CN2016/102731, filed on Oct. 20, 2016.

(30) Foreign Application Priority Data

Aug. 30, 2016 (CN) .................... 2016 2 0981382 U (51) Int. Cl.
*F16M 11/00* (2006.01)
*F16M 11/12* (2006.01)
(Continued)

(52) U.S. Cl.
CPC ............. *F16M 11/126* (2013.01); *F16B 2/12* (2013.01); *F16M 11/041* (2013.01);
(Continued)

(58) Field of Classification Search
CPC ... H05K 7/00; B23P 17/04; F16B 2/12; F16B 11/04; F16M 13/04
See application file for complete search history.

(56) References Cited

U.S. PATENT DOCUMENTS 10,519,991 B2 * 12/2019 Saculles .................... F16B 2/12
2012/0257346 A1 * 10/2012 Hulet ....................... H04M 1/04
361/679.32
(Continued)

FOREIGN PATENT DOCUMENTS

CN          202163370 U    3/2012
CN          204284852 U    4/2015
(Continued)

OTHER PUBLICATIONS

The World Intellectual Property Organization (WIPO) International Search Report and Written Opinion for PCT/CN2016/102731 dated Jun. 5, 2017 7 pages.

*Primary Examiner* — Amy J. Sterling
(74) *Attorney, Agent, or Firm* — Anova Law Group, PLLC (57) ABSTRACT

The present disclosure provides a clamping mechanism having a base. A first holding mechanism extends from one side of the base and movable to form an unfolded position and a folded position relative to the base. A second holding mechanism extends from another side of the base and movable to form the unfolded position and the folded position. The first holding mechanism restricts movement of an electronic device clamped on the clamping mechanism in a first direction in the unfolded position, the second holding mechanism restricts movement of the electronic device in a second direction in the unfolded position, and the second direction is different from the first direction. The present disclosure further provides a pan-tilt-zoom assembly with a clamping mechanism. The PTZ assembly with the clamping mechanism is suited for one-hand user operations and is not top-heavy.

20 Claims, 6 Drawing Sheets

(51) Int. Cl.
  *F16M 13/00* (2006.01)
  *F16B 2/12* (2006.01)
  *F16M 11/04* (2006.01)
  *F16M 13/02* (2006.01)
  *H04M 1/04* (2006.01)

(52) U.S. Cl.
  CPC .......... *F16M 13/00* (2013.01); *F16M 13/022* (2013.01); *H04M 1/04* (2013.01)

(56) References Cited

U.S. PATENT DOCUMENTS

| | | |
|---|---|---|
| 2015/0072555 A1 | 3/2015 | Riddiford et al. |
| 2017/0001576 A1* | 1/2017 | Jonik ................. B60R 11/0241 |
| 2017/0049251 A1* | 2/2017 | Gulick, Jr. ............ A47F 7/0246 |

FOREIGN PATENT DOCUMENTS

| | | |
|---|---|---|
| CN | 204517897 U | 7/2015 |
| CN | 204785449 U | 11/2015 |
| CN | 204829160 U | 12/2015 |
| CN | 205173931 U | 4/2016 |
| CN | 205278691 U | 6/2016 |
| KR | 200440667 Y1 | 6/2008 |

\* cited by examiner

PTZ ASSEMBLY AND A CLAMPING MECHANISM THEREOF

CROSS-REFERENCE TO RELATED APPLICATION

This application is a continuation application of International Application No. PCT/CN2016/102731, filed on Oct. 20, 2016, which in turn claims priority of Chinese Application No. 201620981382.5, filed on Aug. 30, 2016. The entire content of these two applications are incorporated herein by reference.

TECHNICAL FIELD

The present disclosure relates to a Pan-Tilt-Zoom (PTZ) assembly and a clamping mechanism thereof.

BACKGROUND

A PTZ assembly can be used with a variety of portable electronic devices in various scenarios such as in viewing or recording televisions, movies, reality shows, sporting filming, aerial photography, security monitoring, navigation, etc. A PTZ assembly may be of single-axis, double-axis, three-axis, and four-axis, etc. The three-axis PTZ assembly generally has a yaw axis, a roll axis, and a pitch axis, and the movement of each axis of the PTZ assembly may be controlled by a motor. Further, a clamping mechanism may be disposed on one of the axes of the PTZ assembly, where clamping mechanism may be used to clamp a portable electronic device on the PTZ assembly. Often, the existing clamping mechanism is generally fixed and cannot be stored when not in use, thus making it difficult to carry as it takes up a lot of space.

SUMMARY

In view of the existing clamping mechanisms, the present disclosure provides a PTZ assembly and a clamping mechanism thereof that is easy to carry and store.

One aspect of the present disclosure provides a clamping mechanism having a base; a first holding mechanism extending from one side of the base and movable to form an unfolded position and a folded position relative to the base; a second holding mechanism extending from another side of the base and movable to form the unfolded position and the folded position. The first holding mechanism restricts movement of an electronic device clamped on the clamping mechanism in a first direction in the unfolded position, the second holding mechanism restricts movement of the electronic device in a second direction in the unfolded position, and the second direction is different from the first direction.

In some embodiments, the second direction is perpendicular to the first direction.

In some embodiments, the first holding mechanism or the second holding mechanism is adjacent to a side of the base in the folded position.

In some embodiments, the first holding mechanism rotates relative to the base to form the unfolded position and the folded position.

In some embodiments, the second holding mechanism is retractable to the base in the folded position and is clamped between the first holding mechanism and the base.

In some embodiments, the base is substantially a square and includes a body and a support extending from one side of the body away from the body, and the support and the second holding mechanism collectively restrict the movement of the electronic device in the second direction.

In some embodiments, the first holding mechanism includes a first arm rotatably connected to the base and a second arm disposed at a distal end of the first holding mechanism away from the base, and the second arm is used to restrict the movement of the electronic device in the first direction.

In some embodiments, the extending direction of the second holding mechanism is substantially perpendicular to the first direction.

In some embodiments, the first arm and the second arm are respectively adjacent to two sides of the base in the folded position.

In some embodiments, the first arm and the support collectively restrict the movement of the electronic device in the second direction.

In some embodiments, a first abutting portion is disposed on one side of the second arm to restrict movement of the electronic device in a direction away from the base.

In some embodiments, a second abutting portion is also disposed on another side of the second arm opposite to the side of the first abutting portion to restrict movement of the electronic device in a direction toward the base.

In some embodiments, one side of the first arm is substantially flush with one side of the body that faces away from the electronic device.

In some embodiments, one side of the first arm is substantially flush with one side of the support that faces away from the body.

In some embodiments, the second holding mechanism includes a telescopic arm that linearly extends and retracts, and a holding unit disposed at one end of the telescopic arm away from the base, the holding unit and the support respectively holding opposite sides of the electronic device.

In some embodiments, in the folded position, the telescopic arm is retracted into the base and the holding unit is attached to one side of the base and the telescopic arm extends from the base and the holding unit is away from the base.

In some embodiments, a third abutting portion is disposed on one side of the holding unit away from the telescopic arm to restrict movement of the electronic device in a direction away from the base.

In some embodiments, one side of the holding unit away from the telescopic arm is substantially flush with one side of the support away from the body.

In some embodiments, a fourth abutting portion is disposed on one side of the support away from the body to restrict movement of the electronic device in a direction away from the base.

Another aspect of the present disclosure provides a pan-tilt-zoom (PTZ) assembly with a claiming mechanism. The clamping mechanism includes a base; a first holding mechanism extending from one side of the base and movable to form an unfolded position and a folded position relative to the base; a second holding mechanism extending from another side of the base and movable to form the unfolded position and the folded position; where the first holding mechanism restricts movement of an electronic device clamped on the clamping mechanism in a first direction in the unfolded position, the second holding mechanism restricts movement of the electronic device in a second direction in the unfolded position, and the second direction is different from the first direction.

As can be seen, the PTZ assembly and the clamping mechanism provided in the present disclosure is easy to carry and store.

It should be noted that the reference numerals shown in the drawings are described as follows:

1000: clamping mechanism;
1: clamping mechanism body;
10: base;
100: body;
102: support;
12: first holding mechanism;
120: first arm;
122: second arm;
13: rotating shaft;
14: second holding mechanism;
140: telescopic arm;
142: holding unit;
2: fixing mechanism.

The present disclosure will be further illustrated by the following detailed description in conjunction with the accompanying drawings.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

It should be noted that when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

The present disclosure provides a clamping mechanism and a PTZ assembly that uses the clamping mechanism. The PTZ assembly may be used with a variety of portable electronic devices in various scenarios such as in televisions, movies, reality shows, sporting filming, aerial photography, security monitoring, navigation, etc. Further, the PTZ assembly may be single-axis, double-axis, three-axis, and four-axis, etc., and the clamping mechanism may be disposed on any axis of the PTZ assembly to fix an electronic device on the PTZ assembly.

The embodiments of the present disclosure are described in detail below with reference to the accompanying drawings. It should be noted that the embodiments of the present disclosure and the features in the embodiments can be combined when there is no conflict.

Figure 1:
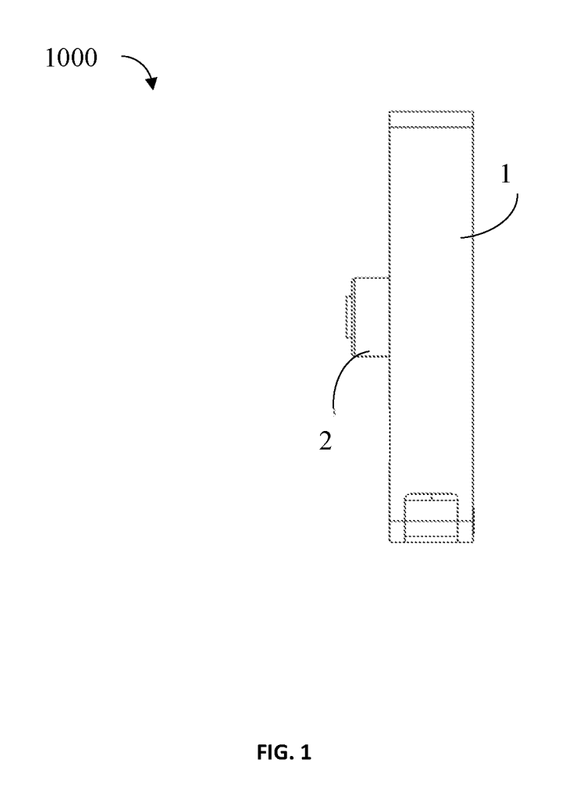
FIG. 1 is a side view of a clamping mechanism according to an embodiment of the present disclosure.

Referring to FIG. 1, a clamping mechanism 1000 includes a clamping mechanism body 1 and a fixing mechanism 2. The fixing mechanism may be used to fix the clamping mechanism 1000 to a supporting mechanism, which may include a fixing base (not shown) and a rotating-shaft supporting mechanism (e.g., a three-axis rotatable mechanism) that may be connected to the fixing base. In particular, the fixing base may be a handle of a handheld PTZ assembly or a fixing mechanism to fix the PTZ assembly to a moving object such as an aircraft. Further, the fixing mechanism 2 may be fixed to a rotating shaft or a rotating arm of the yaw axis or the pitch axis of a three-axis rotating supporting mechanism. In some embodiments, the supporting mechanism may be a surface, such as a desktop, a vehicle dashboard, etc., and the fixing mechanism 2 may be directly disposed on the surface, where the fixing mechanism 2 may be a rotating shaft to enable the fixing mechanism to rotate relative to the surface.

It may be understood that the electronic device may be a camera, a mobile phone, other portable electronic devices (such as an iPad), or the like.

Figure 2:
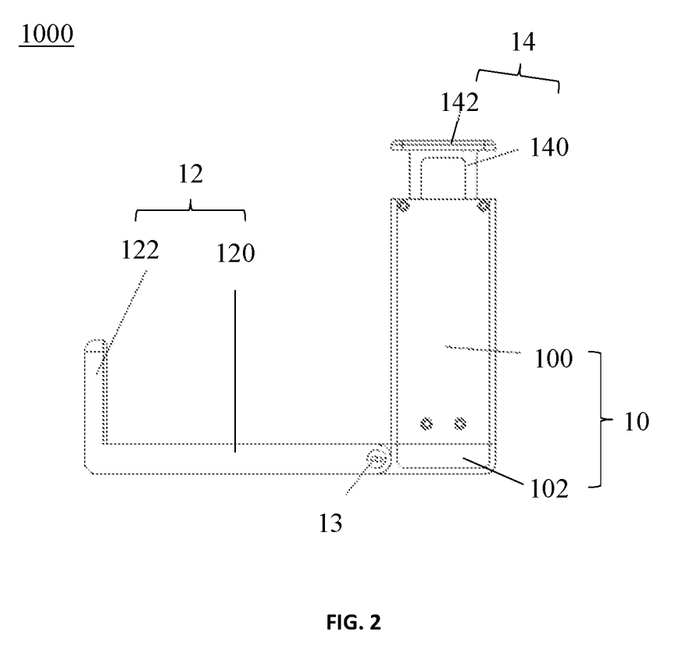
FIG. 2 is a front view of a clamping mechanism in an unfolded position according to an embodiment of the present disclosure.
Figure 3:
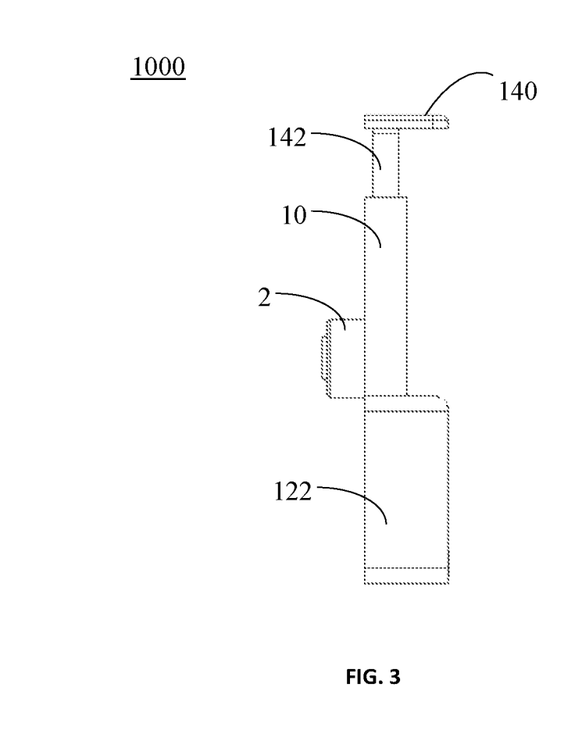
FIG. 3 is a left side view of the clamping mechanism shown in FIG. 2 in an unfolded position.

Referring to FIG. 2 and FIG. 3, which are diagrams of the clamping mechanism 1000 in an unfolded position according to an embodiment of the present disclosure. The clamping mechanism body 1 may include a base 10, a first holding mechanism 12, and a second holding mechanism 14. The first holding mechanism may be connected to a first side of the base 10 via a rotating shaft 13, the second holding mechanism 14 may be disposed on a second side of the base, and the second side may be adjacent to the first side.

The base 10 may be substantially a square and may include a body 100 and a support 102 extending from one side of the body away from the body 100. Further, the support 102 and the second holding mechanism 14 may be respectively located on opposite sides of the body 100. In some embodiments, the base 10 may be a rectangle or other shapes.

The first holding mechanism 12 may be substantially L-shaped and may include a first arm 120 rotatably connected to the base 10 and a second arm 122 disposed at one end of the first arm 120 away from the rotating shaft 13, where the second arm 122 may be substantially perpendicular to the first arm 120. The first holding mechanism 12 may rotate about the rotating shaft 13 to switch between an unfolded position and a folded position. In the unfolded position, the first arm 120 may be disposed substantially perpendicular to the first side of the base 10, and the second arm 122 may be disposed substantially parallel to the first side of the base 10; in the folded position, the first arm 120 may be disposed substantially parallel to the first side of the base 10, and the second arm 122 may be disposed substantially parallel to a second side of the base 10. Further, the first arm 120 and the second arm 122 are respectively adjacent to the first side and the second side of the base 10.

Referring to FIG. 3, a top surface of the first arm 120 may be substantially flush with a top surface of the support 102, and bottom surface of the first arm 120 may be substantially flush with a bottom surface of the support 102. Further, an inner side surface of the first arm 120 (i.e., the side facing the electronic device) may be substantially flush with a clamping surface of the support 102 (i.e., the surface facing the electronic device when the electronic device is clamped).

Figure 4:
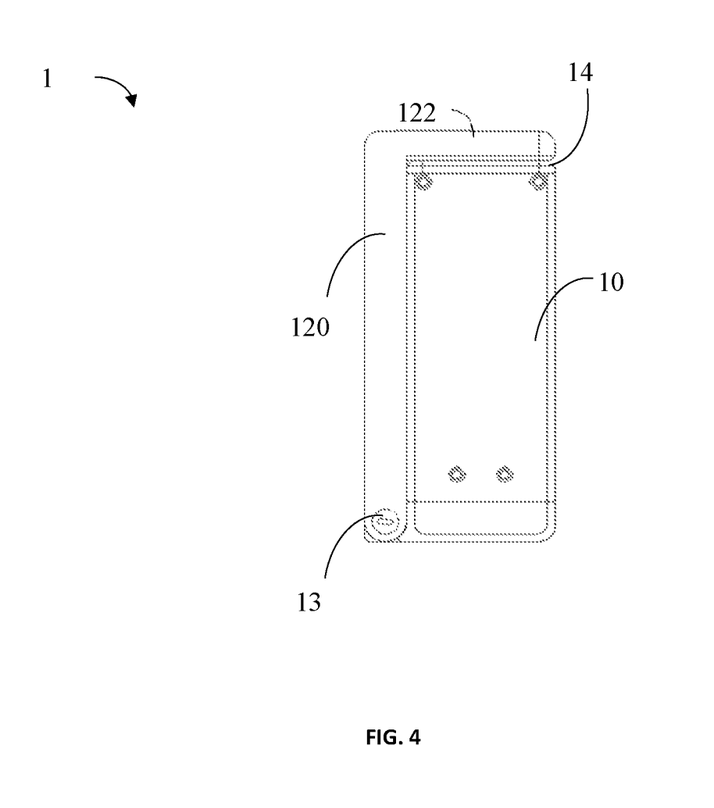
FIG. 4 is a front view of the clamping mechanism shown in FIG. 2 in a folded position.

The second holding mechanism 14 may be linearly extendable relative to the base 10 to switch between the unfolded position and the folded position. In the unfolded position, the second holding mechanism 14 may extend away from a side away from the base 10; in the folded position, the second holding mechanism 14 may retract to the base 10, and the second arm 122 may be disposed on the second holding mechanism 14 (as shown in FIG. 4). The second holding mechanism 14 may include a telescopic arm 140 and a holding unit 142 that may be disposed on one end of the telescopic arm 140 away from the body 100. The top surfaces of the holding unit 142 and the support 102 may be higher than the upper surface of the body 100, so a receiving space to accommodate the electronic device may be formed between the holding unit 142, the body 100, and the support 102.

Figure 5:
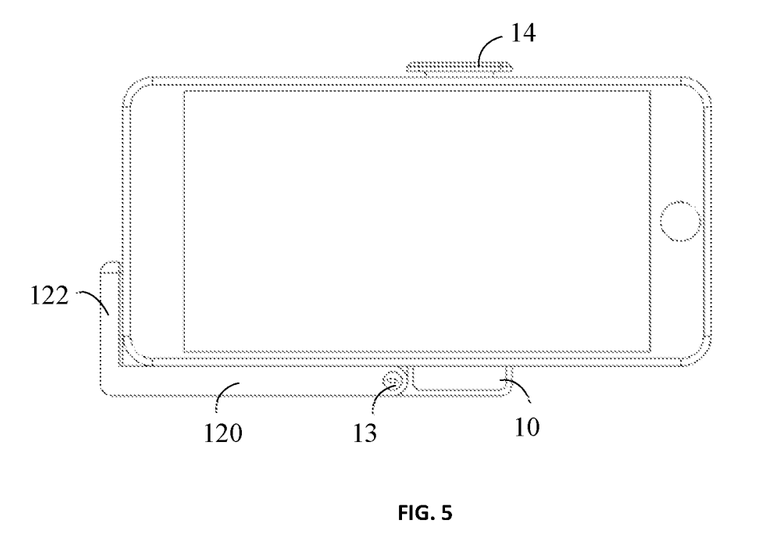
FIG. 5 is a front view of the clamping mechanism shown in FIG. 2 in use.
Figure 6:
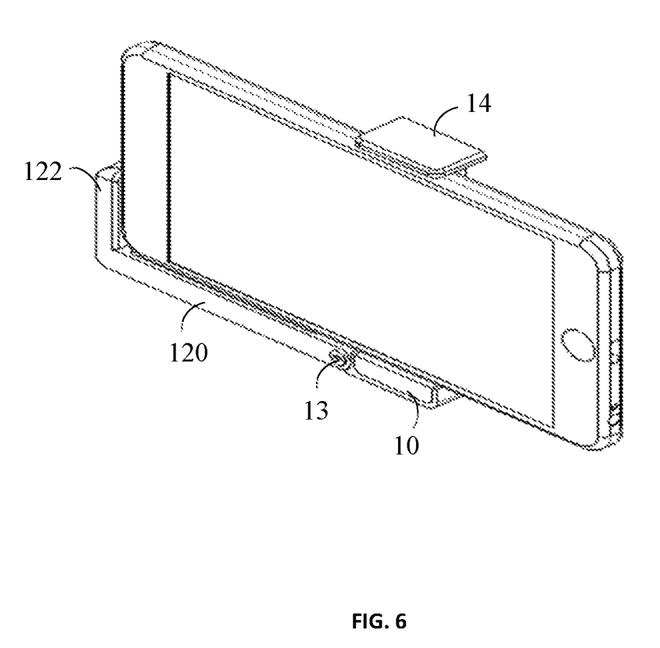
FIG. 6 is a perspective view of the clamping mechanism shown in FIG. 2 in use.

Referring to FIG. 5 and FIG. 6, which illustrate a state in which the clamping mechanism is holding an electronic device thereon. When the electronic device is held on the clamping mechanism, the inner side surface of the first arm 120 and the clamping surface of the support 102 may jointly support the electronic device on a first side of the electronic device, a clamping surface of the holding unit (i.e., the surface facing the electronic device when the electronic device is clamped) may hold a second side of the electronic device, and the second side of the electronic device may be opposite to the first side of the electronic device. An inner side surface of the second arm 122 may abut a third side of the electronic device, which may connect between the first side and the second side of the electronic device. Since the inner side surface of the first arm 120 and the clamping surface of the support 102, and the clamping surface of the holding unit 142 may respectively hold the opposite sides of the electronic device, the movement of the electronic device along the direction from the holding unit 142 to the support 102 (i.e., a first direction) may be restricted. Further, since the inner side surface of the second arm 122 abuts the third side of the electronic device, the movement of the electronic device in a second direction may be restricted, where the second direction may be perpendicular to the first direction.

It can be understood that in order to further stabilize the electronic device on the clamping mechanism, one end of the holding unit 142 away from the telescopic arm 140 may further include a buckle. The buckle may abut against an upper surface (i.e., a side of the electronic device that faces away from the body 100) of the electronic device when the electronic device is clamped thereby restricting the movement of the electronic device in a third direction, which may face in a direction away from the clamping mechanism and may be perpendicular to the first direction and the second direction. Further, it can be understood that a similar buckle may also be disposed on one end of the support 102 away from the body 100 to abut against the upper surface of the electronic device when the electronic device is clamped, thereby further restricting the movement of the electronic device in the third direction. Furthermore, it can be understood that a similar buckle may also be disposed on the first arm 120 to abut against the upper surface of the electronic device when the electronic device is clamped, thereby further restricting the movement of the electronic device in the third direction. Additionally, it can be understood that one or more of the first arm 120, the holding unit 142, and the support 102 may have the similar buckles as long as the movement of the electronic device in the third direction may be restricted.

It can be understood that the top surface of the first arm 120 may also be out of flush with the top surface of the support portion 102, for example, the upper surface of the first arm 120 may be higher or lower than the upper surface of the support portion 102.

It can be understood that in order to restrict the movement of the electronic device along the third direction, an abutting portion may be further or alternatively disposed on the second arm 122. The abutting portion may extend from a top surface of the second arm 122 in a direction substantially parallel to the top surface toward a direction away from the inner side surface of the second arm 122, thereby abutting the upper surface of the electronic device to limit the movement of the electronic device in the third direction. Further, it can be understood that a similar abutting portion may also be disposed on a bottom surface of the second arm 122, which may extend in a direction away from the inner side surface of the second arm 122 in a direction substantially parallel to the top surface. The abutting portions may respectively extend from the top and bottom surfaces of the second arm 122 may respectively abut against the upper and lower surfaces of the electronic device, thereby holding the electronic device firmly.

It can be understood that an electric contact end may be disposed on the body 100, and the electronic device may be electrically or communicably connected to the base 10 through the electric contact end. For example, the electronic device may be charged through the base 10.

In some embodiments, the support 102 and the holding unit 142 may respectively hold both sides of the electronic device along the width direction, and the second arm 122 may hold one side of the electronic device in the longitudinal direction.

It can be understood that a holding mechanism similar to the first holding mechanism 12 may be disposed on one side of the base 10 away from the first holding mechanism 12, and the two holding mechanisms may be respectively clamped on opposite sides of the electronic device, so the back and forth movement of the electronic device in the second direction may be restricted.

When the first holding mechanism 12 is in the folded position, the second arm 122 may be disposed on the holding unit 142. It can be understood that in order to further stabilize the first holding mechanism 12 in the folded position, a hook may be disposed at one end of the second arm 122 away from the first arm 120, and the hook may hook on one side of the holding unit 142 away from the first arm 120. At this time, the second arm 122 may be fixed relative to the holding unit 142, and the holding unit 142 may be restricted by the first arm 120 and the second arm 122 and fixed between the first holding mechanism 12 and the base 10. Further, it can be understood that the hook may also be disposed on the other two sides of the second arm 122 to respectively hook on the top and bottom surfaces of the holding unit 142. Furthermore, it can be understood that the method of fixing the second arm 122 and the holding unit 142 may not be limited to the above method, and any other suitable fixing method may be used. For example, a protrusion may be disposed on one side of the holding unit 142 facing the second arm 122, a groove may be disposed on the inner side surface of the second arm 122 facing the holding unit 142, and the protrusion may match the groove to fix the second arm 122 to the holding unit 142.

In the above embodiment, the first holding mechanism 12 and the second holding mechanism 14 may respectively restrict the movement of the electronic device in the horizontal and vertical directions. It can be understood that the first holding mechanism 12 and the second holding mechanism 14 may be other structures to respectively restrict the movement of the electronic device in a first direction and a second direction, where the first direction may be different from and not parallel to the second direction, and the first direction and the second direction may or may not be perpendicular to each other.

It can be understood that the first holding mechanism 12 may be replaced by other holding mechanisms, which may be disposed on one side of the base by other means, move between the unfolded position and the folded position, restrict the movement of the electronic device in the first direction in the unfolded position, and be attached or move close to the side of the base in the folded position. For example, the holding mechanism may also be a telescopic structure similar to the second holding mechanism. Similarly, the second holding mechanism 14 may also be replaced by other holding mechanisms as long as it may move between the unfolded position and the folded position, restrict the movement of the electronic device in the second direction in the unfolded position, and be attached or move close to the side of the base in the folded position to reduce the storage volume.

In addition, one of ordinary skill in the art can make variations and equivalents having the same effects and applications without departing from the spirit of the present disclosure and such variations and equivalents are considered as within the scope of the present disclosure.

What is claimed is:

1. A clamping mechanism comprising:
   a base;
   a first holding mechanism extending from one side of the base and movable to form an unfolded position and a folded position relative to the base;
   a second holding mechanism extending from another side of the base and movable to form the unfolded position and the folded position;
   wherein:
      the first holding mechanism restricts movement of an electronic device clamped on the clamping mechanism in a first direction in the unfolded position, the second holding mechanism restricts movement of the electronic device in a second direction in the unfolded position, and the second direction is different from the first direction; and
      in the folded position, the second holding mechanism is clamped between the first holding mechanism and the base.

2. The clamping mechanism of claim 1, wherein the second direction is perpendicular to the first direction.

3. The clamping mechanism of claim 1, wherein the first holding mechanism or the second holding mechanism is adjacent to a side of the base in the folded position.

4. The clamping mechanism of claim 1, wherein the first holding mechanism rotates relative to the base to form the unfolded position and the folded position.

5. The clamping mechanism of claim 4, wherein the second holding mechanism is retractable to the base in the folded position.

6. The clamping mechanism of claim 5, wherein the base is substantially a square and includes a body and a support extending from one side of the body away from the body, and the support and the second holding mechanism collectively restrict the movement of the electronic device in the second direction.

7. The clamping mechanism of claim 6, wherein the first holding mechanism includes a first arm rotatably connected to the base and a second arm disposed at a distal end of the first holding mechanism away from the base, and the second arm is used to restrict the movement of the electronic device in the first direction.

8. The clamping mechanism of claim 7, wherein the extending direction of the second holding mechanism is substantially perpendicular to the first direction.

9. The clamping mechanism of claim 7, wherein the first arm and the second arm are respectively adjacent to two sides of the base in the folded position.

10. The clamping mechanism of claim 7, wherein the first arm and the support collectively restrict the movement of the electronic device in the second direction.

11. The clamping mechanism of claim 7, wherein a first abutting portion is disposed on one side of the second arm to restrict movement of the electronic device in a direction away from the base.

12. The clamping mechanism of claim 11, wherein a second abutting portion is also disposed on another side of the second arm opposite to the side of the first abutting portion to restrict movement of the electronic device in a direction toward the base.

13. The clamping mechanism of claim 6, wherein one side of the first arm is substantially flush with one side of the body that faces away from the electronic device.

14. The clamping mechanism of claim 6, wherein one side of the first arm is substantially flush with one side of the support that faces away from the body.

15. The clamping mechanism of claim 6, wherein the second holding mechanism includes a telescopic arm that linearly extends and retracts, and a holding unit disposed at one end of the telescopic arm away from the base, the holding unit and the support respectively holding opposite sides of the electronic device.

16. The clamping mechanism of claim 15, wherein in the folded position, the telescopic arm is retracted into the base and the holding unit is attached to one side of the base and the telescopic arm extends from the base and the holding unit is away from the base.

17. The clamping mechanism of claim 15, wherein a third abutting portion is disposed on one side of the holding unit away from the telescopic arm to restrict movement of the electronic device in a direction away from the base.

18. A pan-tilt-zoom (PTZ) assembly with a clamping mechanism, the clamping mechanism comprising:
   a base;
   a first holding mechanism extending from one side of the base and movable to form an unfolded position and a folded position relative to the base;
   a second holding mechanism extending from another side of the base and movable to form the unfolded position and the folded position;
   wherein:
      the first holding mechanism restricts movement of an electronic device clamped on the clamping mechanism in a first direction in the unfolded position, the second holding mechanism restricts movement of the electronic device in a second direction in the unfolded position, and the second direction is different from the first direction; and in the folded position, the second holding mechanism is clamped between the first holding mechanism and the base.

19. The clamping mechanism of claim 1, wherein in the folded position, the first holding mechanism abuts against the second holding mechanism.

20. The PTZ assembly of claim 18, wherein in the folded position, the first holding mechanism abuts against the second holding mechanism.

* * * * *